United States Patent [19]

Madan

[11] 4,032,261

[45] June 28, 1977

[54] BEARING STRAP AND COOLER

[75] Inventor: Bhim S. Madan, Brockport, N.Y.

[73] Assignee: General Electric Company, Bridgeport, Conn.

[22] Filed: May 13, 1976

[21] Appl. No.: 685,731

[52] U.S. Cl. .............................. 417/366; 417/371; 259/DIG. 35; 308/22

[51] Int. Cl.$^2$ .................. F04B 17/00; F04B 39/06; F16C 37/00

[58] Field of Search .................. 417/366, 371, 372; 259/4 R, 84, DIG. 18, DIG. 35; 308/22, 26; 415/180

[56] References Cited

UNITED STATES PATENTS

| | | | |
|---|---|---|---|
| 1,569,845 | 1/1926 | Murphy | 417/371 |
| 2,223,847 | 12/1940 | Engdahl | 417/366 X |
| 2,382,158 | 8/1945 | Kennedy | 259/DIG. 35 |
| 2,615,942 | 10/1952 | Edman | 259/DIG. 35 |
| 2,713,455 | 7/1955 | Cole | 417/366 |
| 2,759,700 | 8/1956 | Wheatley | 415/180 X |
| 3,121,178 | 2/1964 | Seyfried et al. | 259/DIG. 35 |
| 3,271,013 | 9/1966 | Chambers et al. | 259/DIG. 35 |
| 3,761,203 | 9/1973 | Neidhardt et al. | 417/371 |
| 3,936,100 | 2/1976 | Moores, Jr. et al. | 308/26 X |

FOREIGN PATENTS OR APPLICATIONS

| | | | |
|---|---|---|---|
| 234,242 | 6/1961 | Australia | 259/DIG. 35 |
| 238,235 | 4/1962 | Australia | 259/DIG. 35 |
| 1,268,070 | 6/1961 | France | 259/DIG. 35 |
| 973,005 | 10/1964 | United Kingdom | 259/DIG. 35 |

*Primary Examiner*—John J. Vrablik
*Assistant Examiner*—Donald S. Holland
*Attorney, Agent, or Firm*—John F. Cullen; George R. Powers; Leonard J. Platt

[57] ABSTRACT

A motor driven household mixer has a housing around a rotary motor in a plastic frame, the motor having front and rear bronze bearing assemblies with a fan adjacent the rear assembly and a beater gear box adjacent the front assembly. This is provided with an improved integral bearing strap and cooler for the front assembly comprising vents in the housing adjacent the gear box and a generally H-shaped one piece bearing strap with means securing one leg of the H to the frame forming the leg around the bearing, with the other and wider leg being bent out of the plane of the H and opening towards the vents said leg extending across the entire bearing width whereby air moved by the fan is funneled by the bent leg toward the entire bearing cooling it. The invention also includes a single means securing the one leg to the gear box in which openings are provided to direct the air to the bearing and around it and below the securing leg to cool the entire bearing and leg by forced convection.

4 Claims, 3 Drawing Figures

U.S. Patent    June 28, 1977    4,032,261
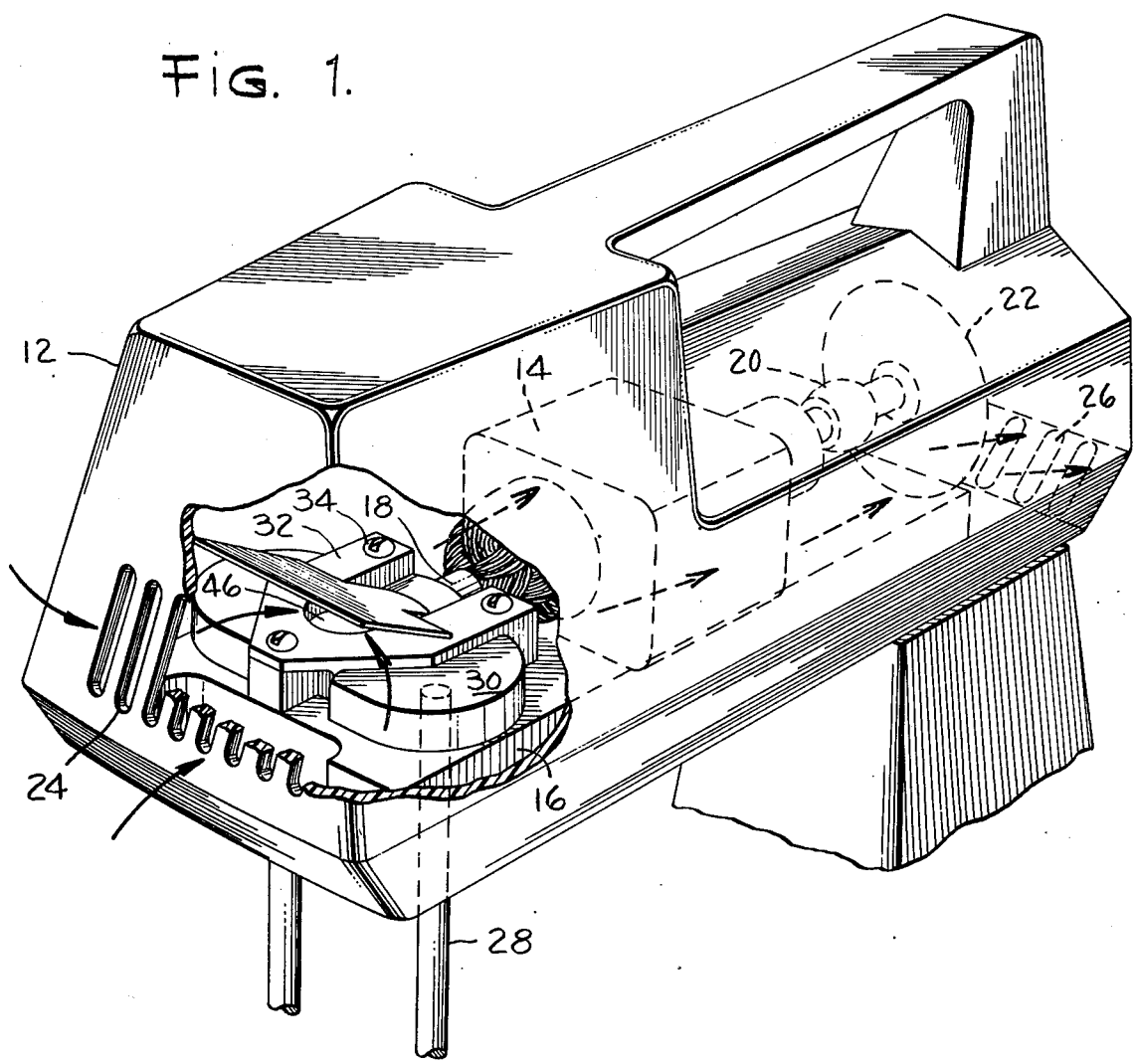
Fig. 1.
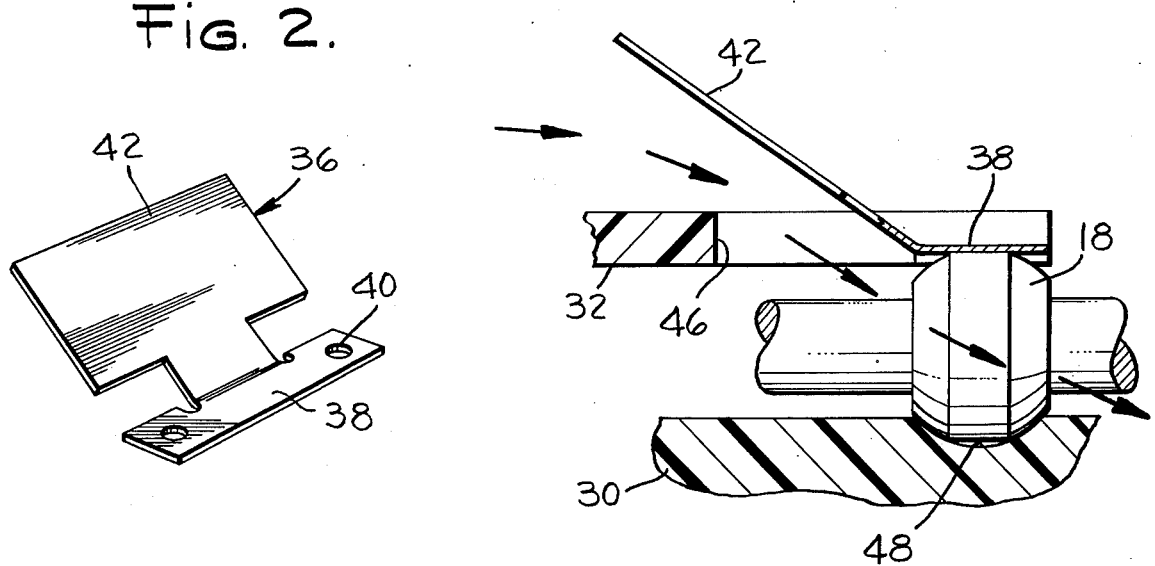
Fig. 2.
Fig. 3.

BEARING STRAP AND COOLER

FIELD OF THE INVENTION

The invention is directed to a single one-piece bearing fastener and air deflector as used in a household mixer that has a heat-developing gear box adjacent the cooled bearing.

DESCRIPTION OF THE PRIOR ART

Recent designs in appliances and especially electric household mixers have eliminated the general motor supporting metal base frame such as die casting requiring accurate machining and finishing thus adding to the cost and weight of the mixer. Newer designs employ a single molded phenolic as a motor frame for its light weight and lower cost. The use of a plastic, however, creates the problem of dissipating heat generated by the moving mixer parts and especially the heat in the area of the gear box that is used to drive the beaters adjacent the front bearing tending towards overheating of the bearing. Various means dissipate the heat such as cooling fins of various forms mounted on the bearing strap or separately mounted fins all aimed at funneling cooling air over the bearing for forced cooling by convection. Generally, such fins have been multiple, separate, and different-shaped lending some complexity to the cooling structure although permitting the use of phenolics in place of metal castings. Typical such cooling structure is shown in U.S. Pat. No. 3,271,013 as applied to household mixers. A combination bearing strap and air deflector for cooling the bearing is desired which is a simple one-piece integral structure easily applied and which holds the bearing in position and funnels the air through and around it to cool the bearing and itself by forced convection.

SUMMARY OF THE INVENTION

Briefly described, the invention is directed to a motor driven household mixer that has a housing around a rotary motor in a plastic frame and has front and rear bronze bearing assemblies with a fan adjacent the rear bearing and a beater gear box adjacent the front bearing assembly. To this general structure there is provided an improved integral bearing strap and cooler for the hotter front assembly that comprises vents in the housing adjacent the gear box and uses a generally H-shaped one-piece bearing strap with means fastening one leg of the H to the frame and deforming the leg around the bearing to secure the bearing in place. The other and wider leg is bent out of the plane of the H and opens towards the vents while extending across the entire front bearing width. The gear box has openings cooperating with the bent leg whereby air moved by the fan is funneled by the wide bent leg towards the bearing and around it below the other narrow bearing strap leg to cool the bearing and the strap leg by forced convection. Thus, the main object of the invention is to provide a single integral bearing strap and cooler structure that both holds the bearing in position and also acts as a directing structure to funnel air around the bearing to cool it and the bearing strap by forced convection.

BRIEF DESCRIPTION OF THE DRAWINGS

In the drawings,

FIG. 1 is a perspective, partially in phantom and broken away, illustrating the invention applied to a food mixer;

FIG. 2 is a perspective of the H-shaped bearing strap and air deflector used in FIG. 1; and FIG. 3 is a partial cross-section through the bearing showing the bent leg and air flow.

DESCRIPTION OF THE PREFERRED EMBODIMENT

Referring to the drawings, a stand-type mixer is shown, although the invention is applicable to light weight portable hand mixers, that has a housing 12, of upper and lower mating sections. The housing is generally plastic and surrounds a rotary motor 14 supported in a frame 16 that may be of any material but, for purposes of this invention, is a plastic molded frame such as phenolic resin. Using plastic makes it possible to mold the entire frame without further machining operations and avoids electrical insulating parts required with metallic frames. However, being plastic and having poor heat conductivity, there is a problem with dissipation of bearing heat all as is well known. The motor has front 18 and rear 20 bronze bearing assemblies and a suitable fan 22, adjacent the rear bearing, draws air into vents 24, through the housing, and out vents 26 for forced air convection cooling. Both bearings are customarily bronze oil-impregnated assemblies requiring no lubrication. The mixer is provided with beaters 28 operable through a beater gear box 30 adjacent the front bearing assembly and immediately inside and adjacent the front vents 24. Because of the gear box assembly 30 heat is generated at the front bearing assembly. The gear box is also plastic containing the usual gears enclosed by cap 32 secured by screws 34 all as is well known. Thus, because of the plastic non-conducting construction and the high friction due especially to heavy loads as encountered with current "dough hook" beaters in the gear box 30, it is necessary to better dissipate the extra heat from bearing 18 to cool the bearing.

To this end, the invention provides an improved bearing strap and cooler for the front bearing assembly that includes placing the vents 24 in the housing directly adjacent gear box 30 so that substantially all the entering air will be captured and directed over and through the gear box and bearing by a one-piece strap and cooler for adequate cooling. To ensure this, there is provided a generally H-shaped one-piece bearing strap 36 as shown in FIG. 2. This strap is generally a stamped-out piece of bronze sheet metal and is an asymmetrical or unequal in width H having one narrow leg 38 with attachment holes 40 and a relatively wide leg 42 being long or wide enough when installed in bearing 18 to extend completely across the entire bearing width to funnel all the air over the entire area. To use the single H member as a combination bearing strap and cooling deflector, narrow leg 38 is used as a bearing strap by placing it over the top of the bearing 18 race and then securing it by deforming it around the bearing with cap 32 and screws 34. In other words, the narrow leg is placed over the bearing and then bent into shape to hold the bearing by tightening down on the cap 32 deforming leg 38 so the bearing is held securely in the motor frame and the means securing the leg thus secures it directly to the gear box. For cooling the bearing, the other wide leg 42 of the integral strap is bent up out of the plane of the H and opening towards the front vents 24 as shown in FIGS. 1 and 3. As previously noted, leg 42 extends across the entire bearing width to capture substantially all air coming through vents 24 and directs it down and across the bearing. In order to cool the bearing completely, the gear box has openings 46 leading down to the bearing 18 and openings 48 around the sides of bearing 18 so that all the air is funneled in the direction of the arrows in FIG. 3 to completely bathe and pass over bearing 18, thus cooling it. Additionally, because it is deformed in close contact around bearing 18, narrow leg 38 also tends to become warm and is sufficiently cooled by funneling all the air below and across it as shown in FIG. 3.

Thus, a simple one-piece preferably asymmetrical H-shaped bearing strap is easily and inexpensively formed; it is easily deformed to form the top bearing strap; it is easily installed; it captures substantially the entire air intake and funnels it all across the entire bearing area needing cooling and cools itself, resulting in a system that cheaply and efficiently cools the hot bearing by forced convection as the air is drawn through the housing by the fan.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. In a motor driven household mixer having a housing around a rotary motor in a plastic frame and having front and rear bronze bearing assemblies, a fan adjacent the rear and a beater gear box adjacent the front assembly, an improved bearing strap and cooler for said front assembly comprising,
   vents in the housing adjacent the gear box;
   a generally H-shaped one-piece bearing strap;
   means securing one leg of the H to the frame deforming said leg around the bearing;
   the other leg being bent out of the plane of the H and opening towards the vents;
   said other leg extending across the entire bearing width;
   whereby air moved by said fan is funneled by said bent leg towards the entire bearing cooling it and past the other leg cooling it.

2. Apparatus as described in claim 1 wherein the means securing said one leg secures it to said gear box.

3. Apparatus as described in claim 2 wherein said legs are unequal in width, the wider leg being said other leg bent to funnel the air flow.

4. Apparatus as described in claim 3 wherein said gear box has openings therein to direct the air below said other bent leg to said bearing and around it below said one leg cooling said bearing and one leg by forced convection.

* * * * *